United States Patent
Geurtz

(10) Patent No.: US 8,490,812 B2
(45) Date of Patent: Jul. 23, 2013

(54) FUEL TANK

(75) Inventor: Heinz-Jürgen Geurtz, Althengstett-Neuhengstett (DE)

(73) Assignee: Dr. Ing. H.C.F. Porsche Aktiengesellschaft (DE)

( * ) Notice: Subject to any disclaimer, the term of this patent is extended or adjusted under 35 U.S.C. 154(b) by 310 days.

(21) Appl. No.: 12/428,506

(22) Filed: Apr. 23, 2009

(65) Prior Publication Data

US 2009/0266832 A1    Oct. 29, 2009

(30) Foreign Application Priority Data

Apr. 24, 2008  (DE) .......................... 10 2008 020 400

(51) Int. Cl.
  *B65D 47/02*  (2006.01)
  *B65D 88/12*  (2006.01)

(52) U.S. Cl.
  USPC .......................................... 220/86.2; 220/562

(58) Field of Classification Search
  USPC .............................. 220/562; 137/583, 115.11
  IPC .................................... B65D 47/02,6/40, 88/12
  See application file for complete search history.

(56) References Cited

U.S. PATENT DOCUMENTS

| | | | | |
|---|---|---|---|---|
| 1,617,868 A * | 2/1927 | Skaggs | ........................... | 137/266 |
| 2,251,664 A * | 8/1941 | Davis | ............................. | 60/494 |
| 3,710,549 A * | 1/1973 | Nichols et al. | ............... | 261/36.1 |
| 3,728,846 A * | 4/1973 | Nilsson | ........................... | 96/134 |
| 3,788,040 A * | 1/1974 | Bragg et al. | .................... | 96/164 |
| 4,287,913 A * | 9/1981 | Bennett et al. | ............... | 137/574 |
| 4,300,699 A * | 11/1981 | Anhegger | .................... | 220/86.2 |
| 4,444,333 A * | 4/1984 | Anhegger | .................... | 220/746 |
| 4,722,454 A | 2/1988 | Fischer | | |
| 4,768,566 A | 9/1988 | Ito et al. | | |
| 4,821,908 A * | 4/1989 | Yost | .............................. | 220/86.2 |
| 5,183,087 A * | 2/1993 | Aubel et al. | .................... | 141/59 |
| 5,456,238 A | 10/1995 | Horiuchi et al. | | |
| 5,462,100 A * | 10/1995 | Covert et al. | .................... | 141/59 |
| 5,570,672 A * | 11/1996 | Kunimitsu et al. | ........... | 123/516 |
| 5,669,361 A | 9/1997 | Weissinger et al. | | |
| 5,816,287 A * | 10/1998 | Hyodo et al. | ................. | 137/587 |

(Continued)

FOREIGN PATENT DOCUMENTS

| | | |
|---|---|---|
| CA | 2235300 | 10/1998 |
| DE | 3017765 A1 | 11/1981 |

(Continued)

OTHER PUBLICATIONS

German Search Report dated Dec. 11, 2008.

*Primary Examiner* — Robert J Hicks
(74) *Attorney, Agent, or Firm* — Gerald E. Hespos; Michael J. Porco; Matthew T. Hespos

(57) ABSTRACT

A fuel tank, in particular for a motor vehicle, has a filler neck for filling fuel into the fuel tank. It is important that a recirculation device having a tube element is provided, which tube element is arranged substantially coaxially with respect to, and so as to be axially at least slightly spaced apart from, the filler neck, such that fuel which is filled into the fuel tank through the filler neck flows as a free jet into an inlet of the tube element. The inlet is situated above a fuel level and the tube element is configured so as to generate an effect of sucking in fuel vapor as fuel is filled into the fuel tank.

8 Claims, 1 Drawing Sheet

U.S. PATENT DOCUMENTS

| | | | |
|---|---|---|---|
| 5,829,619 A * | 11/1998 | Gupta et al. | 220/86.2 |
| 6,269,832 B1 | 8/2001 | Besnard et al. | |
| 6,830,219 B1 * | 12/2004 | Picot et al. | 244/135 R |
| 6,948,523 B2 | 9/2005 | Viebahn | |
| 7,055,556 B2 | 6/2006 | Benjey et al. | |
| 2002/0112763 A1 * | 8/2002 | Romanek et al. | 137/588 |
| 2002/0148510 A1 * | 10/2002 | Viebahn et al. | 137/574 |
| 2002/0157715 A1 * | 10/2002 | Viebahn | 137/588 |
| 2003/0140970 A1 | 7/2003 | Benjey et al. | |
| 2007/0210607 A1 * | 9/2007 | Murabayashi et al. | 296/97.22 |
| 2009/0321461 A1 * | 12/2009 | Vulkan et al. | 220/746 |

FOREIGN PATENT DOCUMENTS

| | | |
|---|---|---|
| DE | 3540740 A1 | 5/1987 |
| DE | 19716812 A1 | 10/1998 |
| DE | 10125821 A1 | 2/2003 |
| DE | 10120542 B4 | 7/2004 |
| DE | 69823311 T2 | 5/2005 |
| EP | 1260398 A2 | 11/2002 |
| GB | 2076758 A | 12/1981 |

* cited by examiner

FUEL TANK

CROSS-REFERENCE TO RELATED APPLICATION

This application claims the priority, under 35 U.S.C. §119, of German application DE 10 2008 020 400.5, filed Apr. 24, 2008; the prior application is herewith incorporated by reference in its entirety.

BACKGROUND OF THE INVENTION

Field of the Invention

The present invention relates to a fuel tank, in particular for a motor vehicle, having a filler neck for filling fuel into the fuel tank. The invention also relates to a motor vehicle fitted with a fuel tank of this type.

German patent DE 101 20 542 B4, corresponding to U.S. Pat. No. 6,948,523, discloses a generic fuel tank for a motor vehicle, which fuel tank has measures for the aeration and deaeration thereof. The measures include at least one filler tube and at least one recirculation line which communicates with the filler tube in such a way that vapors or gases which are laden with hydrocarbons can be circulated from the volume of the fuel tank through the filler tube during a tank filling process. Here, the recirculation line is connected, within the volume encompassed by the container, to the filler tube approximately in the region of the outflow-side end of the filler tube, with the recirculation lines being connected, at their end remote from the filler tube, to a deaeration line which is connected upstream of a fuel vapor filter.

Published, European patent EP 1 260 398 A2 discloses a deaeration system of a motor vehicle fuel tank in which, in a tank filler neck, a tank deaeration line opens out substantially parallel to and in the same direction as the fuel flow direction. In this way, it is possible for the impetus of the gas volume flow flowing in the deaeration line to be utilized to compensate any pressure rise in the filler neck or in the so-called fixing pot thereof.

Translated German patent application DE 698 23 311 T2, corresponding to U.S. Pat. No. 6,269,832, discloses a further deaeration line for a fuel tank, which deaeration line connects an upper part of the fuel tank to a high point close to the upper end of the filler line via a section in the form of a siphon, and which deaeration line has a chamber for the separation of liquids and gases, which chamber is provided, on its base, with an outlet device for the liquid phase which is provided in the deaeration line. Here, the outlet device is a device for generating a so-called venturi effect which, during the filling of the fuel tank, promotes the expulsion of the liquid phase which is present in the deaeration line.

Further fuel tanks or filler necks are known for example from published, non-prosecuted German patent application DE 101 25 821 A1, from published, non-prosecuted German patent application DE 35 40 740 A1 (corresponding to U.S. Pat. No. 4,722,454), from U.S. Pat. No. 4,768,566, from U.S. Pat. No. 5,456,238 and from U.S. Pat. No. 5,669,361.

SUMMARY OF THE INVENTION

It is accordingly an object of the invention to provide a fuel tank that overcomes the above-mentioned disadvantages of the devices of this general type, which in particular at least reduces an undesired escape of hydrocarbons when the tank of the motor vehicle is being filled.

With the foregoing and other objects in view there is provided, in accordance with the invention, a fuel tank. The fuel tank contains a filler neck for filling fuel into the fuel tank and a recirculation device having a tube element with an inlet. The tube element is disposed substantially coaxially with respect to, and so as to be axially at least slightly spaced apart from, the filler neck, such that the fuel being filled into the fuel tank through the filler neck flows as a free jet into the inlet of the tube element, with the inlet being situated above a fuel level and with the tube element configured to generate an effect of sucking in fuel vapor as the fuel is filled into the fuel tank.

The invention is based on the general concept of arranging, in a fuel tank, a tube element coaxially with respect to, and so as to be axially spaced apart from, a filler neck of the fuel tank, such that fuel which is filled into the fuel tank through the filler neck flows as a free jet into an inlet of the tube element, with the inlet being situated above a fuel level and with the tube element generally being configured so as to generate an effect of sucking in fuel vapor as fuel is filled into the fuel tank. It is therefore possible with the tube element according to the invention for a fuel-vapor/air mixture which is present above the fuel level to be sucked into the tube element, and for the hydrocarbon constituents of the fuel-vapor/air mixture to be combined with the fuel, as fuel is filled into the fuel tank, such that the hydrocarbon proportion of the fuel-vapor/air mixture which is present in the fuel tank above the fuel level can simultaneously be reduced as the fuel is filled into the fuel tank. Since the fuel level slowly rises as the fuel tank is filled, and the fuel-vapor/air mixture which is arranged above the fuel level is thereby displaced via a deaeration line, it is possible by use of the tube element according to the invention, which may be a constituent part of a recirculation device, to reduce the hydrocarbons which are discharged via the deaeration line, such that a filter device, for example in the form of an activated carbon filter, which is conventionally arranged in the deaeration line can be configured to be smaller and therefore so as to minimize installation space. With the recirculation device according to the invention, it is also possible to reduce the hydrocarbon emissions during the tank filling process, that is to say during the filling of the fuel tank, which is highly advantageous in particular with regard to the ever more stringent emissions regulations, for example in the USA. Furthermore, a recirculation device of this type, which is composed substantially of the above-described tube element, can be produced in an extremely cost-effective manner and can be fixed in the fuel tank with little assembly expenditure.

In one advantageous refinement of the solution according to the invention, the tube element has a constriction which acts as a venturi nozzle. The constriction in the tube element has the effect here that the speed of a fluid flowing through the tube element, in this case of the fuel, behaves in an inversely proportional manner to a varying tube cross section. That is to say, the speed of the fuel is greatest at the point where the cross section of the tube is narrowest. According to the law of continuity for incompressible fluids, the same fluid quantity, that is to say the same fuel quantity, emerges from any arbitrary section of the tube element as has been introduced into the section. The liquid, that is to say the fuel, must therefore pass the narrow point with the same throughflow rate as the rest of the tube element, such that the speed of the fuel is coercively increased in the region of the cross-sectional constriction. As a result of the coercive increase in the flow speed in the narrowed section of the tube element, a suction effect is generated here, which suction effect may be utilized by a corresponding configuration of the tube element such that, in addition to the fuel, a fuel-vapor/air mixture above the fuel level is sucked in and the hydrocarbon constituents of the mixture are combined with the fuel. Therefore, as the fuel tank is filled, it is possible for the hydrocarbon proportion in the fuel-vapor/air mixture to be simultaneously reduced. A tube element which is configured in this way can be produced in a cost-effective manner and in virtually any desired form and does not require any further components for activation, but rather is ready for use at all times and begins to suck in the fuel-vapor/air mixture as soon as fuel is filled into the tube element via the filler neck.

The inlet of the tube element is expediently flared, that is to say is in particular of a funnel-shaped configuration. The funnel-shaped flaring of the inlet of the tube element makes it possible here for the fuel to be filled into the tube element centrally, with the fuel-vapor/air mixture being sucked into the edge regions of the inlet and being moved with the fuel through the tube element. As they are transported through the tube element, at least a large proportion of the hydrocarbon particles of the fuel-vapor/air mixture are combined with the fuel, as a result of which first fuel and second a fuel-vapor/air mixture with a considerably reduced hydrocarbon proportion emerge out of the outlet of the tube element again. Since a continuous recirculation movement is generated during the filling of the fuel tank, which recirculation movement constantly reduces the hydrocarbon proportion of the fuel-vapor/air mixture, the hydrocarbon proportion of the fuel-vapor/air mixture which is displaced by the rising fuel level is continuously reduced, such that a fuel-vapor/air mixture with a continuously decreasing hydrocarbon proportion escapes via the deaeration line. This is associated with a reduced deaeration volume flow rate of the fuel-vapor/air mixture. In this way, it is possible first for the filter device which is arranged in the deaeration line to be configured to be correspondingly weaker, that is to say in particular to be smaller, and second to considerably improve a hydrocarbon balance, in particular during a tank filling process, of the motor vehicle, which is a significant advantage in particular against the background of the stringent US emissions regulations.

It is self-evident that the features specified above and those yet to be explained below can be used not only in the respectively specified combination but rather also in other combinations or individually without departing from the scope of the present invention.

Other features which are considered as characteristic for the invention are set forth in the appended claims.

Although the invention is illustrated and described herein as embodied in a fuel tank, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
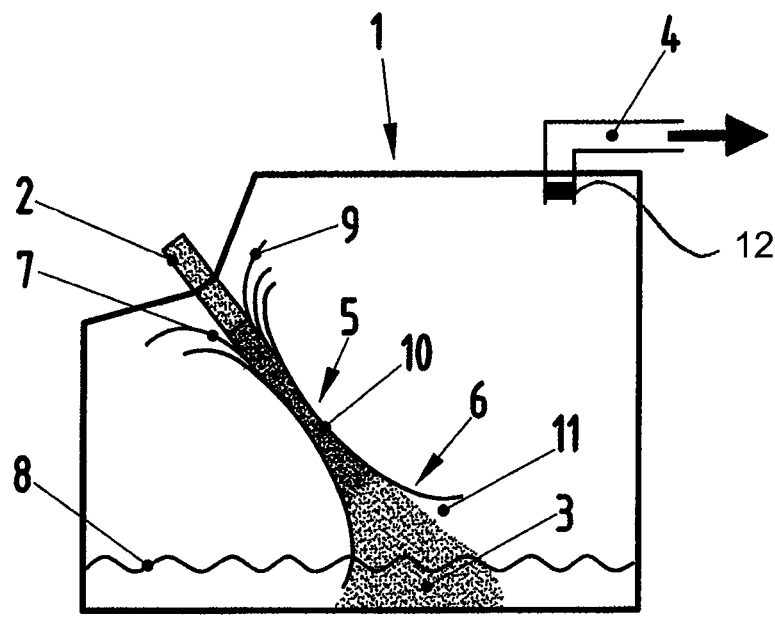
FIG. 1 is a diagrammatic, sectional view through a fuel tank according to the invention.

Referring now to the figures of the drawing in detail and first, particularly, to FIG. 1 thereof, there is shown a fuel tank 1 that has a filler neck 2 for filling fuel 3 into the fuel tank 1 and a deaeration line 4. Here, the deaeration line 4 serves to discharge a fuel-vapor/air mixture, which is displaced as fuel 3 is filled into the fuel tank 1, to the outside. Here, in order that hydrocarbons which are dissolved in the fuel-vapor/air mixture are not emitted into the environment, a device 12, for example an activated carbon filter 12, is conventionally arranged in the deaeration line 4, which filter device 12 is capable, on account of its large inner surface area, of bonding the evaporating hydrocarbon constituents. During normal operation of a motor vehicle which is fitted with the fuel tank 1 according to the invention, fuel 3 is conventionally continuously extracted from the fuel tank 1, as a result of which fresh air is sucked in from the outside via the deaeration line 4 and the filter device which is arranged in the deaeration line 4 is thereby simultaneously backflushed.

According to the invention, a recirculation device 5 having a tube element 6 is now provided within the fuel tank 1, which tube element 6 is arranged substantially coaxially with respect to, and so as to be axially at least slightly spaced apart from, the filler neck 2. Here, the tube element 6 is positioned relative to the filler neck 2 such that fuel 3 which is filled into the fuel tank 1 through the filler neck 2 can flow as a free jet into an inlet 7 of the tube element 6. The inlet 7 is situated above a fuel level 8, with the tube element 6 being configured so as to generate an effect of sucking in fuel vapor 9 as fuel 3 is filled into the fuel tank 1. As a result of the effect of sucking in fuel vapor 9, fuel vapor 9 is continuously sucked into the inlet 7 of the tube element 6 as the fuel tank 1 is filled with fuel 3, with it being possible for the hydrocarbon constituents which are dissolved in the fuel vapor 9 to be combined with the fuel 3 again as they flow through the tube element 6. During the filling of the fuel tank 1, therefore, the fuel-vapor/air mixture 9 is simultaneously cleaned, that is to say the hydrocarbon proportion of the fuel-vapor/air mixture 9 is simultaneously reduced.

To be able to generate the suction effect as the fuel 3 is filled into the fuel tank 1, the tube element 6 has, for example, a constriction 10 which acts as a venturi nozzle. Here, the tube element 6 utilizes the venturi effect, which means basically that a speed of the fuel 3 flowing through the tube element 6 behaves inversely proportionally to a varying cross section. That is to say the speed of the fuel 3, that is to say of the fluid, is greatest where the cross section of the tube element 6 is narrowest, that is to say in this case in the region of the constriction 10.

It is generally possible here for the tube element 6 to be composed of plastic or from metal, wherein in particular a tube element 6 composed of plastic can be produced in an extremely cost-effective manner and permits virtually freely selectable shaping. As may also be seen from FIG. 1, the tube element 6 has, at its inlet 7 and at its outlet 11, a flared portion which, in the exemplary embodiment shown, is formed in the manner of a funnel. Here, the inlet 7 of the tube element 6 is logically arranged above the outlet 11 of the tube element 6, and is in particular positioned such that the fuel level 8 does not reach the height of the inlet 7 even when the fuel tank 1 is completely full.

Figure 2:
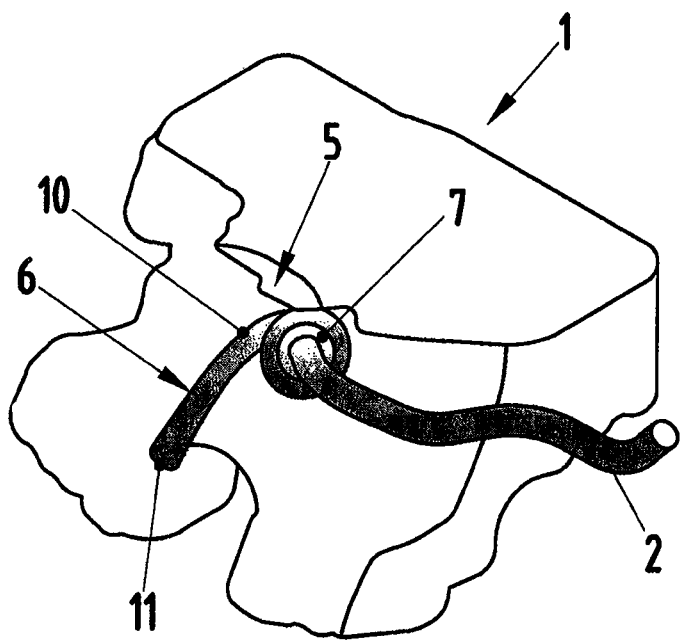
FIG. 2 is a diagrammatic, perspective view of a possible embodiment of a fuel tank according to the invention.

The tube element 6 illustrated in FIG. 1 is for example of a straight configuration, whereas the tube element 6 of the recirculation device 5 in the fuel tank 1 according to FIG. 2 is of slightly angled, that is to say a bent configuration. Regardless of whether the tube element 6 is of curved or substantially rectilinear configuration, the tube element 6 generates an effect of sucking in the fuel vapor 9, which leads to the hydrocarbon proportion in the fuel-vapor/air mixture 9 above the fuel level 8 being reduced.

By use of the recirculation device 5 according to the invention, it is therefore possible for an emission of hydrocarbons through the deaeration line 4 during a tank filling process, that is to say as the fuel tank 1 is filled with fuel 3, to be reduced, as a result of which first a hydrocarbon emission balance of the vehicle is improved and second the filter element, for example the activated carbon filter element 12, which is arranged in the deaeration line 4 can be configured to be smaller and therefore likewise more cost-effective.

Here, the fuel tanks 1 illustrated in FIGS. 1 and 2 are of course to be regarded merely as examples, such that other embodiments of fuel tanks 1 are also to be encompassed by the invention if the fuel tanks 1 contain the recirculation device 5 according to the invention in the form of a tube element 6. Likewise, it is not necessary for the invention that the filler neck 2, as shown in FIG. 1, to have a rectilinear shape; it is in fact also possible for the filler neck 2, as shown in FIG. 2, to have bends. It is important here merely that the tube element 6 is arranged with its inlet 7 substantially coaxially with respect to, and spaced apart from, an outlet of the filler neck 2, such that the fuel 3 which is filled into the fuel tank 1 through the filler neck 2 can flow as a free jet into the inlet 7 of the tube element 6.

The invention claimed is:

1. A fuel tank, comprising:
   a fuel tank body having an interior for storing fuel;
   a filler neck for filling the fuel into the interior of the fuel tank body, the filler neck having an inlet external of the fuel tank body and an outlet communicating with the interior of said fuel tank body; and
   a recirculation device having a tube element completely disposed inside of said fuel tank body, said tube element having a funnel-shaped inlet and an outlet lower than the inlet, the inlet of the tube element being disposed substantially coaxial with the outlet of the filler neck and spaced apart from said filler neck, such that said inlet of said tube element opens directly into the interior of the fuel tank body at a position external of the filler neck, with said inlet of said tube element being positioned in the fuel tank for fuel stored in the fuel tank body not to reach the inlet even when the fuel tank body is filled with the fuel, and said tube element having a constriction configured to function as a Venturi nozzle that generates a suction for sucking fuel vapor from the interior of the fuel tank body into said funnel-shaped inlet as fuel being filled into the fuel tank through said filler neck flows as a free jet into said inlet of said tube element.

2. The fuel tank according to claim 1, wherein said tube element is formed from a material selected from the group consisting of plastic and metal.

3. The fuel tank according to claim 1, further comprising:
   a deaeration line having a profile; and
   a filter device disposed in said profile of said deaeration line.

4. The fuel tank according to claim 1, wherein the outlet of said tube element is flared.

5. The fuel tank according to claim 1, wherein said tube element has a shape selected from the group consisting of substantially straight and curved.

6. The fuel tank according to claim 4, wherein said outlet is funnel-shaped.

7. The fuel tank according to claim 3, wherein said filter device is an activated carbon filter.

8. A motor vehicle, comprising:
   a fuel tank having an interior for storing fuel, a filler neck for filling fuel into said interior of the fuel tank, the filler neck having an inlet external of the fuel tank and an outlet communicating with the interior of the fuel tank, and a recirculation device having a tube element completely disposed in the interior of said fuel tank, said tube element having a funnel-shaped inlet and an outlet lower than the inlet, the inlet of the tube element being disposed substantially coaxial with the outlet of the filler neck and spaced apart from said filler neck, such that said inlet of said tube element opens directly into the interior of the fuel tank at a position external of the filler neck, with said inlet of said tube element being positioned in the fuel tank for fuel stored in the fuel tank not to reach the inlet even when the fuel tank is filled with the fuel, and said tube element having a constriction configured to function as a Venturi nozzle that generates a suction for sucking fuel vapor from the interior of the fuel tank into said funnel-shaped inlet as fuel being filled into the fuel tank through the filler neck flows as a free jet into the inlet of the tube element.

* * * * *